(12) United States Patent
Roach et al.

(10) Patent No.: US 10,293,913 B1
(45) Date of Patent: May 21, 2019

(54) TERMINATION ASSEMBLY FOR USE WITH BALLOON ENVELOPES

(71) Applicant: LOON LLC, Mountain View, CA (US)

(72) Inventors: Kevin Roach, Boulder Creek, CA (US); Daniel Henry Fourie, Sunnyvale, CA (US)

(73) Assignee: LOON LLC, Mountain View, CA (US)

( * ) Notice: Subject to any disclaimer, the term of this patent is extended or adjusted under 35 U.S.C. 154(b) by 317 days.

(21) Appl. No.: 14/633,369

(22) Filed: Feb. 27, 2015

Related U.S. Application Data

(62) Division of application No. 14/340,684, filed on Jul. 25, 2014, now abandoned.

(51) Int. Cl.
*B64B 1/40* (2006.01)
*B64B 1/58* (2006.01)
*B32B 37/12* (2006.01)

(52) U.S. Cl.
CPC ............ *B64B 1/58* (2013.01); *B32B 37/1207* (2013.01); *B64B 1/40* (2013.01); *B32B 2457/00* (2013.01); *B32B 2605/18* (2013.01)

(58) Field of Classification Search
CPC .... B64B 1/42; B64B 1/58; B64B 1/60; B64B 1/62; B64B 1/64; B64B 1/40; B64B 1/44; B64B 1/50; B64B 1/52
See application file for complete search history.

(56) References Cited

U.S. PATENT DOCUMENTS

| 2,635,671 A | 4/1953 | La Mere et al. |
| 2,656,293 A | 10/1953 | Huch |
| 2,666,600 A | 1/1954 | Huch et al. |
| (Continued) | | |

FOREIGN PATENT DOCUMENTS

| CN | 1241515 A | 1/2000 |
| CN | 102178996 A | 9/2011 |
| JP | 09-056934 | 3/1997 |

OTHER PUBLICATIONS

Yajima, N. A New Design and Fabrication Approach for Pressurized Balloon. Advances in Space Research. vol. 26, No. 9. © 2000, pp. 1357-1360.

(Continued)

*Primary Examiner* — Scott W Dodds
(74) *Attorney, Agent, or Firm* — Botos Churchill IP Law LLP (57) ABSTRACT

The present disclosure provides an apparatus for use on a balloon having a balloon envelope. The apparatus includes a frame body comprising first and second members, an adjustable arm attached to the first member and a circular heating element disposed on a surface of the second member. The adjustable arm may be configured to cause the first member to move in a direction with respect to the surface the second member. The surface of the second member may be arranged to receive a termination plate and a portion of a balloon envelope. By moving the adjustable arm between first and second positions with respect to the surface of the second member, the termination plate and the portion of a balloon envelope are pressed together. In this regard, the circular heating element, when activated, is configured to cause the termination plate to heat bond with the portion of the balloon envelope.

16 Claims, 8 Drawing Sheets

300

(56) References Cited

U.S. PATENT DOCUMENTS

| | | | |
|---|---|---|---|
| 2,679,224 A | 5/1954 | Sturtevant | |
| 2,703,769 A | 3/1955 | Stinger et al. | |
| 2,767,941 A | 10/1956 | Gegner et al. | |
| 2,790,479 A | 4/1957 | Mastenbrook | |
| 2,929,082 A * | 3/1960 | Schultz | A43D 95/12 |
| | | | 12/59.7 |
| 3,047,252 A | 7/1962 | Huch et al. | |
| 3,149,017 A | 9/1964 | Ehrreich et al. | |
| 3,269,884 A | 8/1966 | Slater | |
| 3,369,954 A | 2/1968 | Fener | |
| 3,558,083 A | 1/1971 | Conley et al. | |
| 3,686,721 A * | 8/1972 | Nelson | B64B 1/60 |
| | | | 24/304 |
| 4,434,958 A * | 3/1984 | Rougeron | E04H 7/14 |
| | | | 244/126 |
| 4,662,134 A | 5/1987 | Illgner | |
| 4,705,235 A * | 11/1987 | Regipa | B64B 1/58 |
| | | | 244/31 |
| 4,713,047 A | 12/1987 | Klinkel | |
| 4,795,520 A | 1/1989 | Klabius et al. | |
| 4,877,205 A | 10/1989 | Rand | |
| 4,911,380 A | 3/1990 | Regipa | |
| 5,061,331 A | 10/1991 | Gute | |
| 9,027,874 B1 | 5/2015 | Roach et al. | |
| 9,027,877 B1 | 5/2015 | Brookes | |
| 9,174,719 B1 | 11/2015 | Roach et al. | |
| 9,221,531 B1 | 12/2015 | Brookes | |
| 9,242,712 B1 | 1/2016 | Ratner | |
| 9,371,123 B2 | 6/2016 | Roach et al. | |
| 2009/0002257 A1 | 1/2009 | de Jong et al. | |
| 2011/0083784 A1 | 4/2011 | Henry et al. | |
| 2011/0108612 A1 | 5/2011 | Nickell et al. | |
| 2014/0238600 A1 | 8/2014 | Mahn | |
| 2015/0174817 A1 | 6/2015 | Roach et al. | |
| 2016/0263815 A1 | 9/2016 | Roach et al. | |

OTHER PUBLICATIONS

Winker, J. A. Pumpkins and Onions and Balloon Design. Advances in Space Research. vol. 30, No. 5. © 2002, pp. 1199-1204.

P. G. Scott et al. "Long Duration Balloon Technology Survey." Final Report: Report No. WII-9942-01-TR-01. Wizen International, Inc. Mar. 11, 1989, 66 pages. Retrieved from: <http://www.dtic.mil/dtic/tr/fulltext/u2/a206975.pdf>.

A. L. Morris. "Scientific Ballooning Handbook." NCAR Technical Note. Atmospheric Technology Division, National Center for Atmospheric Research. May 1975, 258 pages.

Notification of the First Office Action for Chinese Patent Application No. 201480075881.1, dated Feb. 16, 2017.

* cited by examiner

TERMINATION ASSEMBLY FOR USE WITH BALLOON ENVELOPES

CROSS-REFERENCE TO RELATED APPLICATIONS

The present application is a divisional of U.S. patent application Ser. No. 14/340,684, filed Jul. 25, 2014, the disclosure of which is incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, a plurality of tendons to support the lobes and a termination plate for securing the tendons to the balloon.

In some situations, a termination plate assembly for securing tendons to a balloon envelope may be used. The termination plate assembly may help prevent the tendons from shifting with respect to the apex of the envelope. In addition, the assembly may help transfer the hoop load from a given tendon to the opposite side of the plate. This may form a continuous loop of tensile loading that constrains pressure of the lift gas inside the balloon envelope.

Typically, the termination plate assembly may be attached to the balloon envelope before the balloon can take flight. However, some efforts to attach the termination plate assembly to the balloons can become extremely time-consuming and lack consistency.

BRIEF SUMMARY

Aspects of the present disclosure are advantageous for providing apparatus for securing termination plate assemblies to balloon envelopes. In one embodiment, the apparatus includes a frame body comprising first and second members, an adjustable arm attached to the first member and a circular heating element disposed on a surface of the second member. The adjustable arm may be configured to cause the first member to move in a direction with respect to the surface the second member. The surface of the second member may be arranged to receive a termination plate and a portion of a balloon envelope. By moving the adjustable arm between first and second positions with respect to the surface of the second member, the termination plate and the portion of a balloon envelope are pressed together. In this regard, the circular heating element, when activated, is configured to cause the termination plate to heat bond with the portion of the balloon envelope.

In one example, if the first member is the first position, the frame body is configured to receive the tendon termination plate and the portion of the balloon envelope on the surface of the second member. If the first member is in the second position, the frame body is further configured to activate the heat bond between the tendon termination plate and the portion of the balloon envelope.

In another example, the circular heating element can be configured to transmit heat at a predetermined temperature to activate the heat bond. The heat may be capable of melting a portion of the termination plate and the portion of the balloon envelope together. In some embodiments, a heat activatable adhesive may be disposed between the tendon termination plate and the portion of balloon envelope. The heat activatable adhesive, when heated, may be configured to cause activation of the heat bond.

In another embodiment, a system is provided. The system includes a balloon having a balloon envelope and an apparatus for use with the balloon envelope. The apparatus includes a frame body comprising first and second members, an adjustable arm attached to the first member and a circular heating element disposed on a surface of the second member. The adjustable arm may be configured to cause the first member to move in a direction with respect to the surface the second member. The surface of the second member may be arranged to receive a termination plate and a portion of a balloon envelope. By moving the adjustable arm between first and second positions with respect to the surface of the second member, the termination plate and the portion of a balloon envelope are pressed together. In this regard, the circular heating element, when activated, is configured to cause the termination plate to heat bond with the portion of the balloon envelope.

In yet another embodiment, a method is provided. The method includes receiving a tendon termination plate and a balloon envelope at a circular heat press device. The circular heat press device includes a frame body comprising first and second members, an adjustable arm attached to the first member and a circular heating element disposed on a surface of the second member. The adjustable arm may be configured to cause the first member to move in a direction with respect to the surface the second member. The surface of the second member may be arranged to receive a termination plate and a portion of a balloon envelope. The first member may towards the second member by extending the adjustable arm of the circular heat press device from a first position to a second position. Thereupon, a heat bond may be activated between the tendon termination plate and the portion of the balloon envelope.

DETAILED DESCRIPTION

The present disclosure generally relates to firmly securing termination plate assemblies to balloon envelopes. For example, an apparatus, such as a circular heat press may be used for attaching the termination plate assemblies to the balloon envelopes. By using the circular heat press to heat bond a portion of a plate body for the termination plate assembly to a corresponding portion of the balloon envelope, the plate may be rapidly secured to the envelope while also gaining a consistent coefficient of thermal expansion (CTE) match across the envelope system.

In some embodiments, the circular heat press may include a frame body that comprises top and bottom members and an adjustable arm attached to the top member. The adjustable arm may be arranged so that it can be raised and lowered thereby causing the top member to move in a direction with respect to a surface of the bottom member. The surface of the bottom member may be arranged so that it may receive the termination plate assembly and a portion of the balloon envelope film material. For example, the portion of the balloon envelope may indicate or otherwise mark a particular area of the envelope for securing a given termination plate. The plate body of the assembly may be of a certain type of material, such as a type of plastic to facilitate activation of the heat bond. When the top member of the circular heat press is lifted or raised upward, the termination plate and envelope can be positioned so as to rest on the bottom member of the press. As such, the bottom member, the tendon termination plate and the portion of the balloon envelope may all have a substantially similar circular shape.

A circular heating element may be attached to the surface of the bottom member of the circular heat press. The circular heating element may be configured to transmit a certain amount of heat to cause heat bonding of the termination plate assembly to the balloon envelope.

Activation of the heat bond can be caused in several ways. In one embodiment, a doubler "cap" portion of the termination plate may be configured to heat bond (e.g., melt) directly with the balloon envelope when heated to a predetermined temperature. In that regard, the top member of the circular heat press may be lowered so as to help activate the heat bond by causing the termination plate assembly and balloon envelope to be pressed together.

In other embodiments, a heat activatable adhesive may be disposed between the termination plate and the balloon envelope. The heat activatable adhesive, when heated to a predetermined temperature, may cause an activation of the heat bond.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example System

Figure 1:
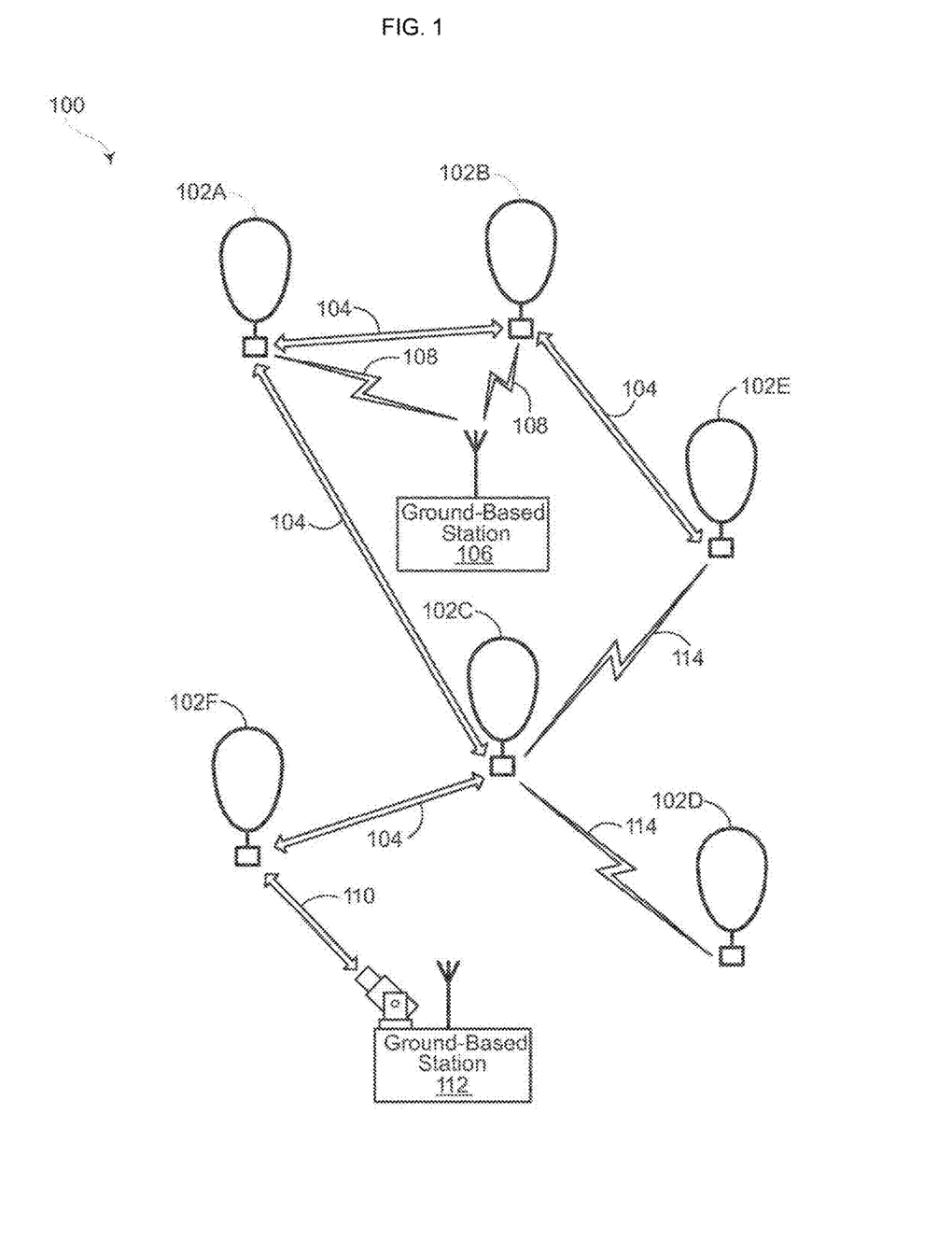
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
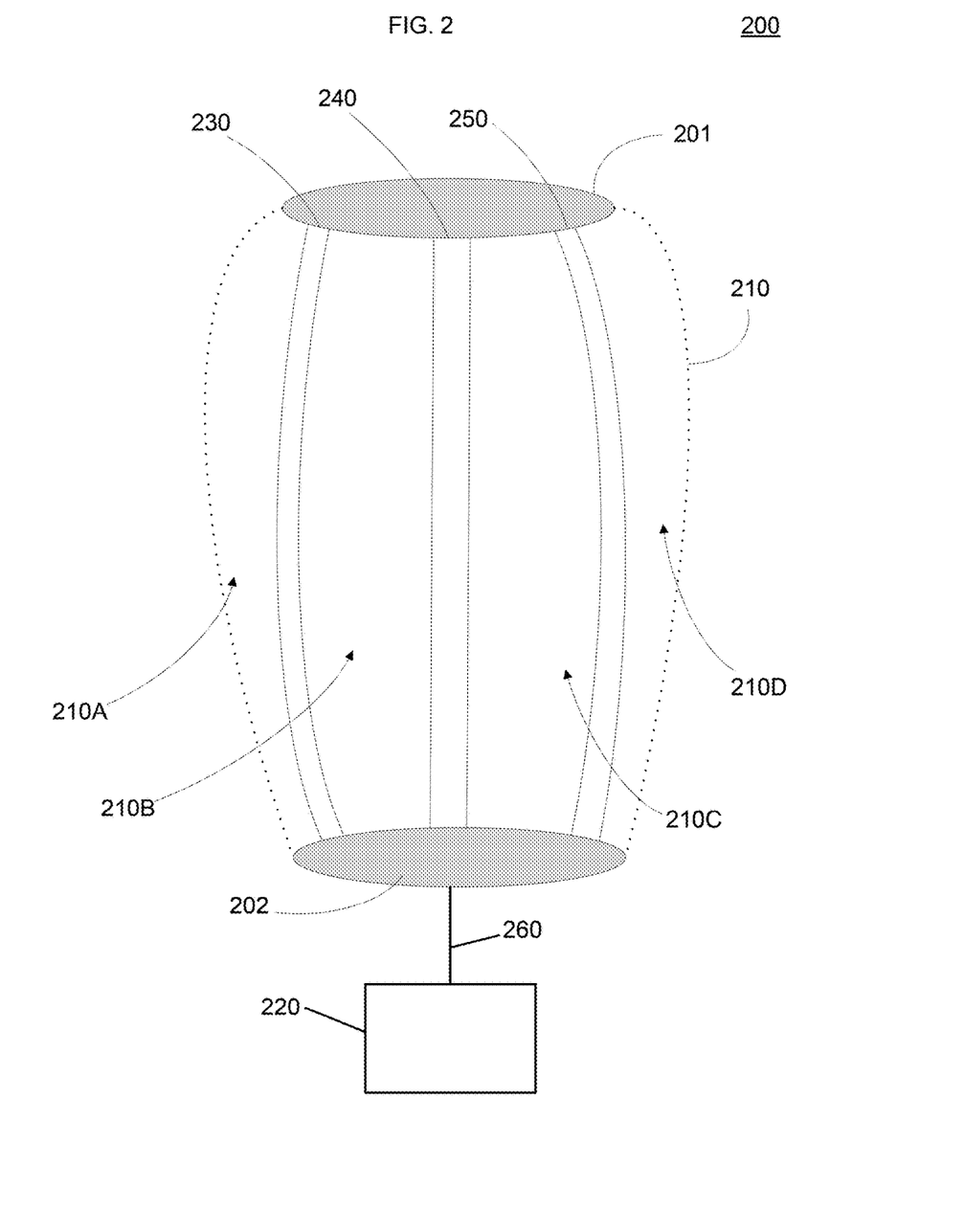
FIG. 2 is an example of a balloon in accordance with aspects of the present disclosure.

FIG. 2 is an example balloon 200, which may represent any of the balloons of balloon network 100. As shown, the balloon 200 includes a balloon envelope 210, a payload 220 and a plurality of tendons 230 attached to the envelope 210 and a termination plate 240.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores.

Pressurized lift gas within the balloon envelope 210 may cause a force or load to be applied to the balloon 200. In that regard, the tendons 230 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a tubular sleeve may be adhered to the respective envelopes with the tendon positioned within the tubular sleeve. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of assembly, such as a termination plate 201, which may be positioned at the apex of balloon envelope 210. In some examples, bottom ends of the tendons 230 may also be connected to one another. For example, a corresponding termination plate 202 may be disposed at a base or bottom of the balloon envelope 210. The termination plate 201 at the apex may be the same size and shape as the plate 202 at the bottom of the envelope 210. Both termination plates may include corresponding components for attaching the tendons 230 thereto.

Figure 3:
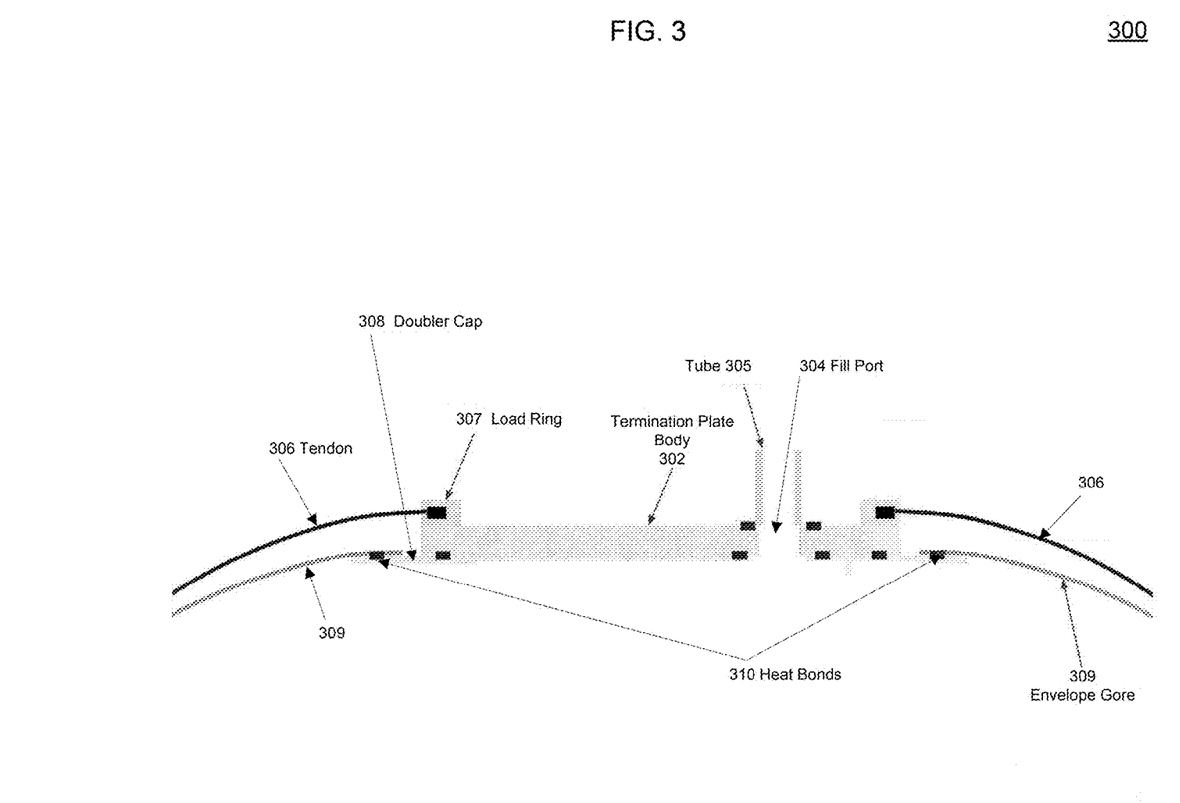
FIG. 3 is an example of a termination plate assembly in accordance with aspects of the present disclosure.

FIG. 3 is an example of a termination plate assembly 300. Here, a side cut-way view of the termination plate assembly 300 is shown. In this example, the termination plate assembly includes a number of components, such as a plate body 302 having an opening including a fill port 304, and a plurality of tendons 306 that are attached to termination plate body 302. In some examples, a tube 305 may be attached to the fill port 304 in order to fill the balloon envelope with lift gas. As noted above, the balloon envelope that may be comprised of a plurality of envelope gores, such as envelope gore 308.

Plate body 302 of the termination plate assembly 300 may be made of a lightweight yet rigid material, such as a type of plastic or other types of similar materials. Because the plate body 302 may not itself be load bearing, the termination plate assembly 300 may include a load bearing mechanism for supporting the tendons attached to the assembly. As shown, the termination assembly 300 may include a load ring 307 or cable that can be coupled to each tendon in order to secure that tendon to the assembly 300. In some aspects, the load ring 307 can be a forged metal ring or another type of mechanism strong enough to support the load carried by the tendons. This load ring 307 may be configured to reach around the plate body 302 of termination assembly 300 in a manner so that it can couple each tendon to the plate.

As shown in FIG. 3, the plate body 302 includes a doubler cap 308. The doubler cap 308 may be of the same material as the plate body or other types of materials that are capable of bonding with the material of envelope gores, such as envelope gore 309. In this embodiment, the doubler cap 307 may be attached to envelope gores 309, for example, by using heat bonds 310. As will be discussed later, various techniques can be employed for applying the heat bonds 310 to seal together portions of the plate body 302 to the envelope gores 309.

Figure 4:
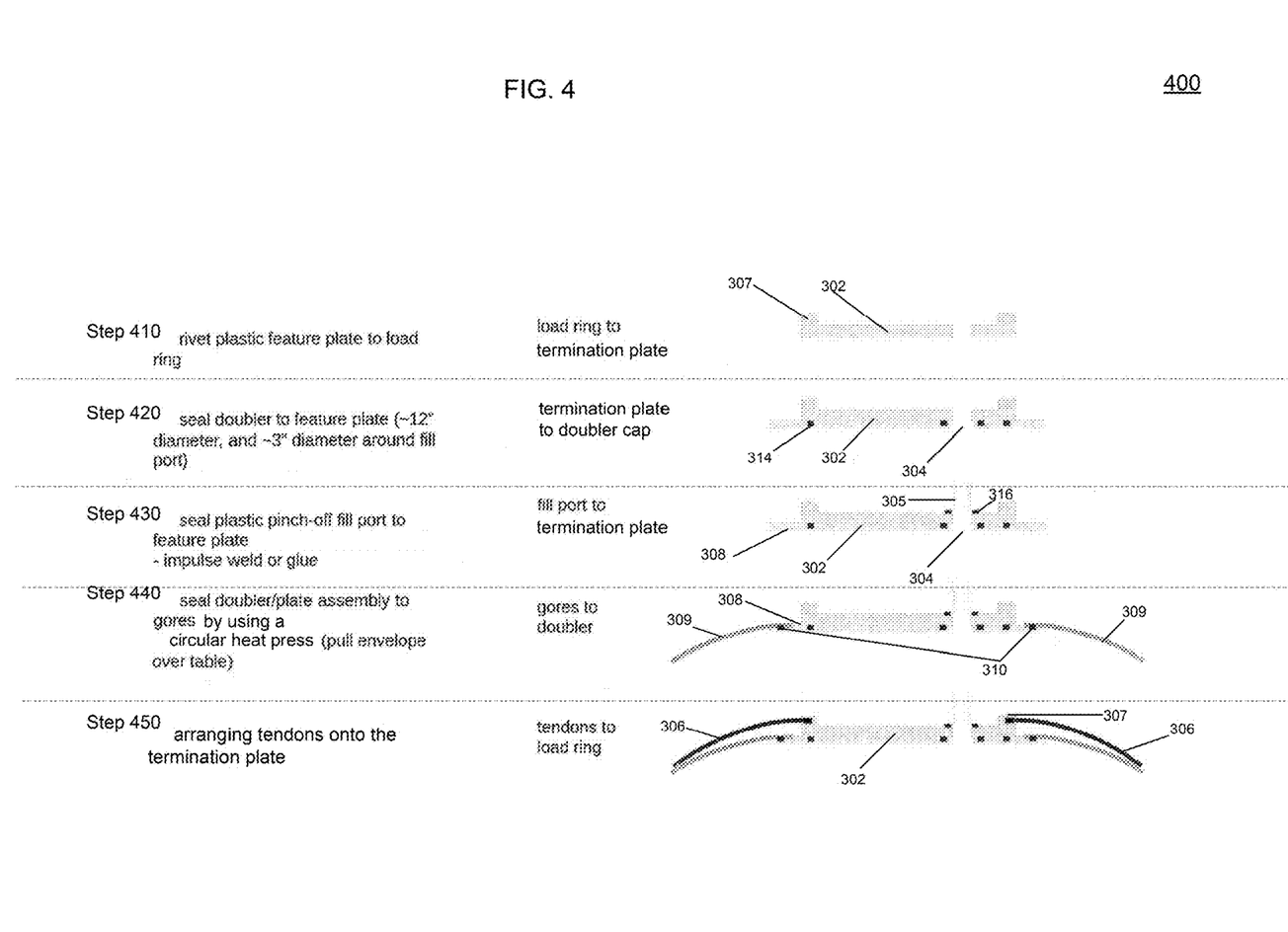
FIG. 4 is a process in accordance with aspects of the present disclosure.

FIG. 4 is a process 400 that may be used, for example, to assemble aspects of the termination plate assembly 300 as described above. At step 410, the load ring 307 may be attached to the plate body 302. For example, a number of screws can be riveted through pre-configured openings in brackets used for holding the load ring 307 to the plate body 302. At step 420, the doubler cap 308 may be attached to the plate body 302, for example, by using a sealant 314. In some aspects, a modified smaller version of the circular heat press described herein may be used to activate the sealant 314. Examples of the circular heat press are further described below. At step 430, the tube 305 may be attached to the fill port 304, for example, by using an impulse weld 316, various kinds of glue, or other similar techniques. At step 440, the doubler cap 308 attached the plate body 402 may be sealed to envelope gores 309, for example, by using heat bond 310. At step 450, a plurality of tendons, such as tendons 306, may be coupled to the plate body 302, for example, by attaching each tendon to the load ring 307 for holding the tendons 306 in place on the balloon envelope.

Example Apparatus

Figure 5:
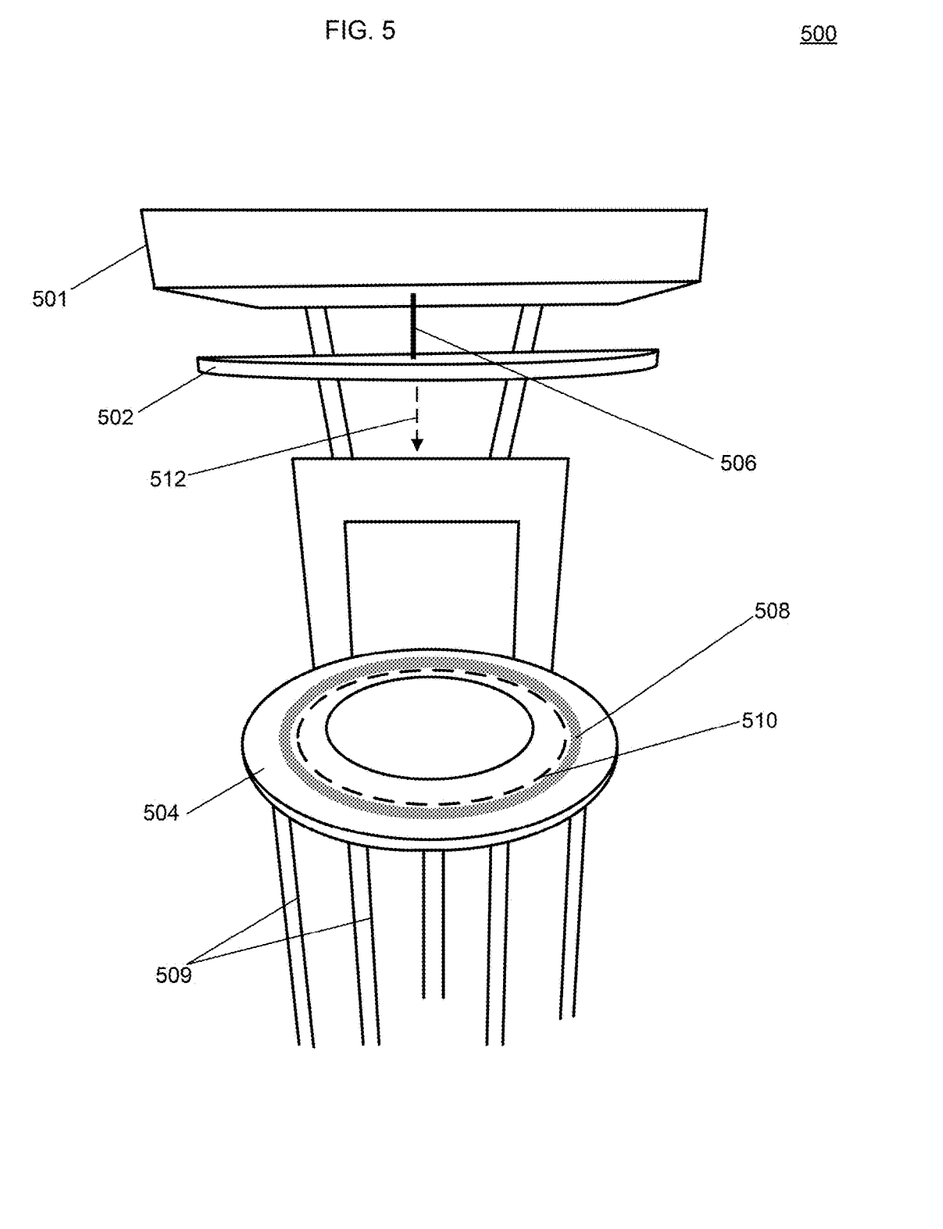
FIG. 5 is an example of a circular heat press in accordance with aspects of the present disclosure.

As noted above, one aspect of the present technology provides an apparatus, such as a circular heat press 500 for attaching a termination plate assembly, such as termination plate assembly 300, to a balloon envelope, such as balloon envelope 210.

FIG. 5 is an example of the circular heat press 500. In this example, the circular heat press 500 includes a frame body 501 having first and second members 502 and 504 and an adjustable arm 506 attached to the first member 502, and a circular heating element 508 disposed on a surface of the second member 504. The surface of the second member 504 may be arranged to receive the tendon termination plate (not shown) and a portion of the balloon envelope (not shown) in order to heat bond the two together by using the circular heating element 508. The circular heat press 500 can be mounted on any suitable support. As shown, a portion of the circular heat press 500 is mounted on a plurality of support posts 509.

As shown, the first member 502 may be arranged above the second member 504. In this configuration, the first member 502 may serve as a top "platen" or member of the circular heat press 500 with the second member 504 serving as a bottom platen. In addition, the first and second members 502 and 504 of the circular heat press 500 may be comprised of a rigid material of sufficient thermal mass, such a type of metal.

The first and second members 502 and 504 may have corresponding or complementary shapes. For example, here, both are configured in a circular shape. An advantage of this circular shape is that it may help with positioning the termination plate assembly 300 onto the circular heat press 500. For this reason, the termination plate may also include a similar circular shape.

To help align the termination plate assembly 300 on the circular heat press 500, one or more indicators 510 may be used. As shown, the indicators 510 are disposed along the surface of the second member 504. In some embodiments, these indicators 510 can include one or more circular or semi-circular rings arranged along an inner circumference of the second member 504. These indicators 510 may help arrange the termination plate assembly 300 with the balloon envelope so that they can be joined together. For example, the indicators 310 may be used to facilitate or help arrange the assembly and the balloon envelope, such that they are both positioned over and aligned with the circular heating element 508 disposed on the surface of the second plate 504.

Circular heating element 508 can be configured to generate a certain amount of heat to cause the termination plate assembly 300 to heat bond with the balloon envelope. For example, the heat bond may include melting a portion of the termination plate assembly 300 and the balloon envelope together when the circular heating element 508 is activated. In some embodiments, the circular heating element 508 may have a generally planar surface so that the heat bond may be consistently applied.

Alternatively, heat activatable adhesives or other types of similar adhesives may be used for activating the heat bond. For example, a heat activatable adhesive may be disposed between the termination plate assembly 300 and the balloon envelope. In this example, the circular heating element can be configured to transmit heat of a predetermined temperature that can the heat activatable adhesive to cause heat bonding of the termination plate assembly 300 to the balloon envelope.

Whether or not a heat activated adhesive or other types of similar adhesives are used for activating the heat bond, an advantage of heat bonding the termination plate assembly 300 to the balloon envelope is that the heat bonding results in a faster and easier process with minimal parts, and may produce a better Coefficient of Thermal Expansion (CTE) match across the heat bonded materials.

The circular heating element 508 can be activated to generate heat in several ways. In one example, a controlled flow of electricity may be sent through the circular heating element 508 for generating heat. In other examples, the circular heat press 500 may include one or more sensors (not shown) that can sense when the first and second members 502 and 504 are moving towards each other. In this example, the sensing of this moving motion can be used as an indicator to activate the circular heating element 508. Conversely, the circular heating element 508 can be deactivated from generating heat by reversing any of the operations described above, such as by stopping the flow of electricity or by moving the first and second members 502 and 504 apart, or by other suitable techniques.

Adjustable arm 506 can be configured to move the first member 502 towards the second member 504 in the direction of arrow 512. For example, by extending the adjustable arm 506, the first member 502 may be made to move toward the second member 504 of the circular heat press 500, thereby causing the two members 502 and 504 to move towards each other with a certain amount of force. The adjustable arm 535 may be joined to the frame body 501 and first member 502 by using a number of mechanical arm parts (not shown) so that the arm 506 can extend or react lengthwise to different positions.

In some embodiments, the adjustable arm 535 may be activated, for example, by using a communication control panel (not shown) of the circular heat press 500 or various other type of wired or wireless control units (not shown) for controlling the press. In that regard, the circular heat press 500 may include communication circuitry (not shown). This communication circuitry may include a receiver/transmitter for processing control signals for the circular heat press 500. In some examples, these control signals may include commands for the press 500, e.g., to activate movement of the adjustable arm 506 and/or to activate heat bonding operations of the circular heat press 500. The control signals may also include commands to activate a flow of electricity for heating up the circular heating element 508.

Figures 6A, 6B:
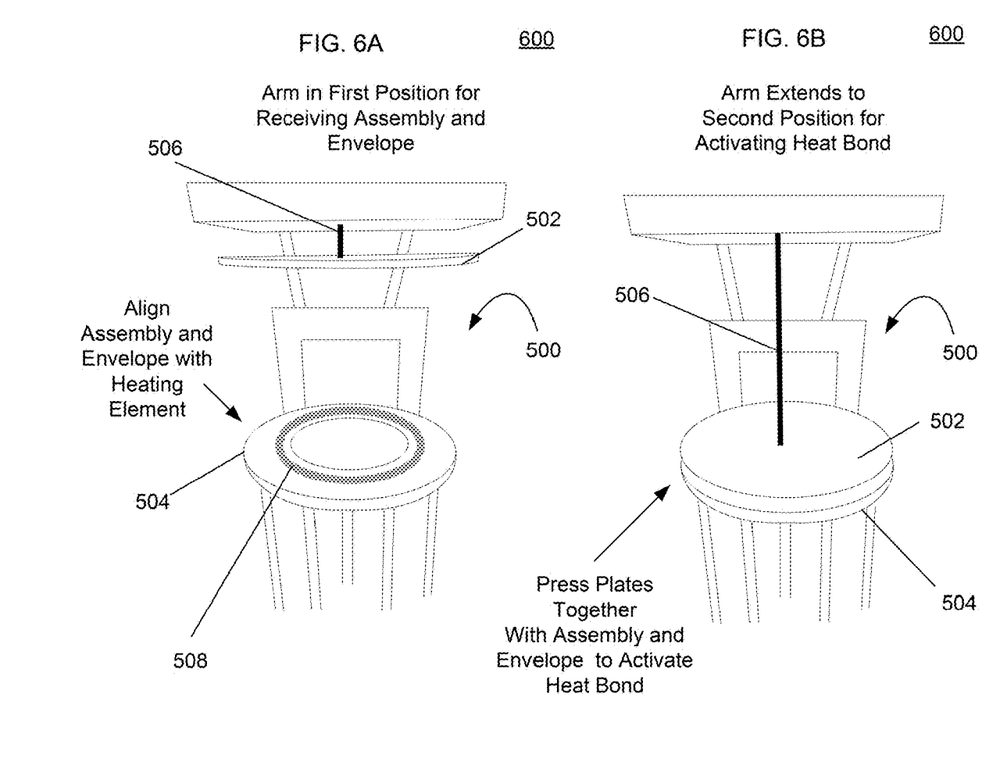
FIGS. 6A-6C are example views of the circular heat press of FIG. 5 in accordance with aspects of the present disclosure.
Figure 6C:
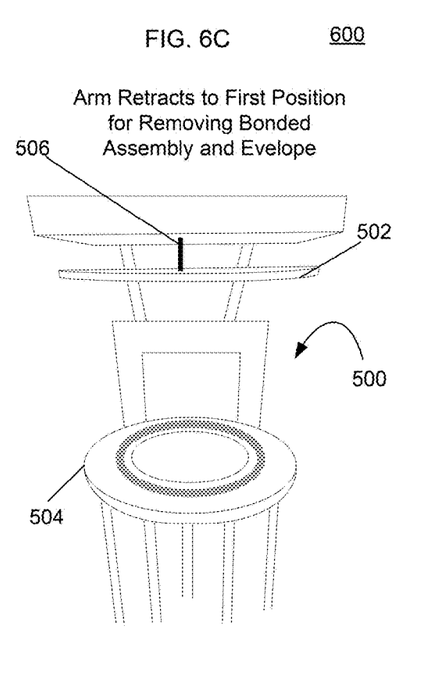

FIGS. 6A-6C are example views 600 of the circular heat press 500 of FIG. 5, which may be used for attaching a termination plate assembly (not shown), such as termination plate assembly 300, to a balloon envelope (not shown), such as balloon envelope 210, as described above. With respect to FIG. 6A, adjustable arm 506 is shown in a first position. The first position may allow the arm to hold the first member 502 of the circular heat press 500 away from the second member 504. In this position, the first and second members 502 and 504 may be spaced apart enough so that a portion of balloon envelope may be arranged onto a surface of the second member 504 then the termination plate assembly 300 may be arranged onto that portion of the balloon envelope. Thereafter, the termination plate assembly 300 can be aligned, using indicator 510 (shown in FIG. 5), with the heating element 508 disposed on a surface of the second member 504.

In FIG. 6B, the adjustable arm 506 of the circular heat press 500 is shown in a second position. When the circular heat press 500 is activated in response to a command signal from a control unit or panel (not shown), the circular heat press may extend the adjustable arm 506, thereby causing the first member 502 to move towards the second member 504. In some embodiments, this movement may be done with sufficient force to press together the termination assembly and the portion of the balloon envelope disposed on the second member 504 in order to activate the heat bond between them. As noted above, the heat bonding may include melting the assembly and envelope together via the circular heating element 508 and/or using a type adhesive, such as a heat activated adhesive, disposed there between.

Turning to FIG. 6C, adjustable arm 506 is shown back in the first position. For example, the adjustable arm 506 may be retracted from the second position shown in FIG. 6B to the first position of FIG. 6C. This may allow the bonded assembly and envelope to be removed from the surface of the second member 504 of the circular heat press 500. As discussed above, adjustable arm 506 may be activated to retract back to the first position by a command signal from the control unit or panel (not shown).

Example Flow Diagram

Figure 7:
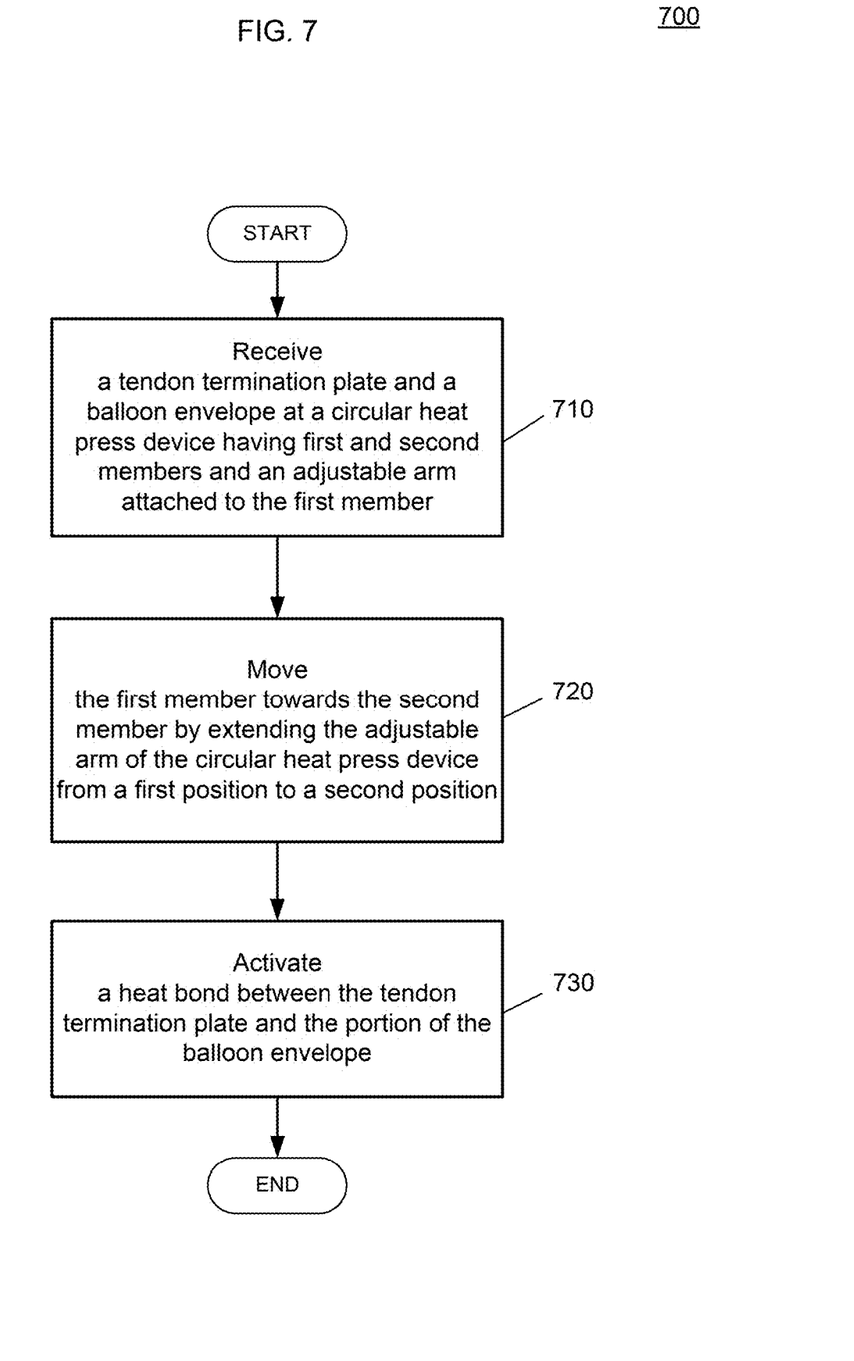
FIG. 7 is an example of a flow diagram in accordance with aspects of the present disclosure.

To better aid in understanding an example of some of the aspects described above, reference is now made to example flow diagram 700 of FIG. 7. As previously discussed, the following operations do not have to be performed in the precise order described below. Rather, as mentioned above, various operations can be handled in a different order or simultaneously, and operations may be added or omitted.

In block 710, one or more tendon termination plates and a balloon envelope may be received at a circular heat press device, such as circular heat press 500 that has first and second members and an adjustable arm attached to the first member. As noted above, corresponding tendon termination plates may be arranged at an apex and bottom of the balloon envelope. Each tendon termination plate and a portion of the balloon envelope may be arranged onto a surface of the second members, such that the plate and envelope are aligned with a similarly shaped heating element attached to the surface.

In block 720, the first may be moved towards the second members by extending an adjustable arm of the circular heat press device from a first position to a second position. This may cause the first member attached to the adjustable arm to move towards the second member with a certain amount of force to cause activation of a heat bond between the plate and envelope disposed there between.

In block 730, a heat bond may be activated between tendon termination plate and the balloon envelope. For example, when the first and second members press together the tendon termination plate and the balloon envelope, the heat bond may be activated. As noted above, the heat bond may be activated by melting a portion of the tendon termination plate and the balloon envelope together or by arranging a heat activatable adhesive between the plate and the envelope. Thereafter, the tendon termination plate and balloon envelope may be moved from the circular press and used to complete an assembly of a particular balloon.

Figure 8:
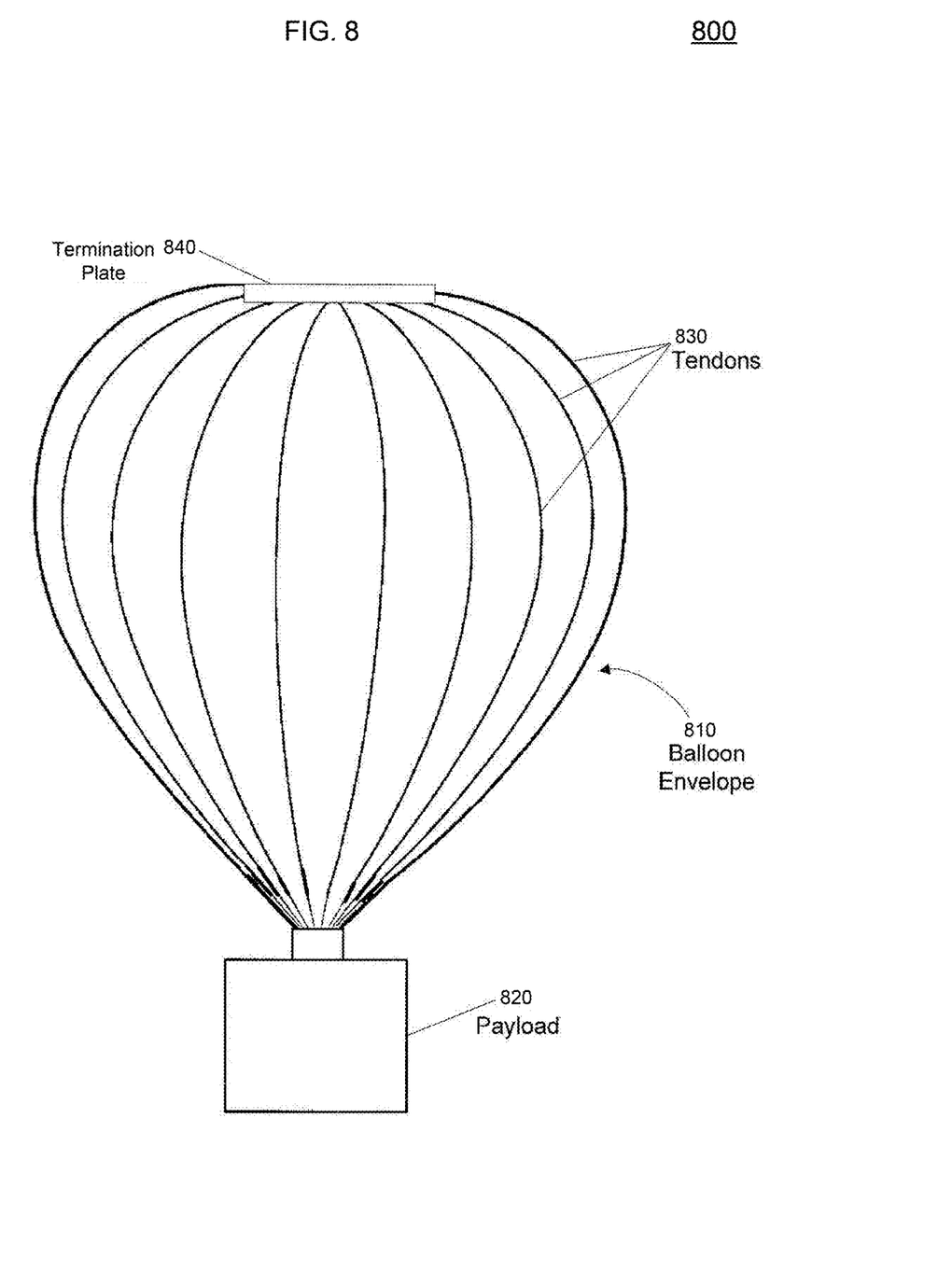
FIG. 8 is another example of a balloon in accordance with aspects of the present disclosure.

FIG. 8 is another example of a balloon 800, which includes a termination plate assembly 840 corresponding to termination assembly 300 as discussed above. In this example, the termination assembly 840 includes a termination plate positioned at an apex of the balloon 800. As discussed above, the termination assembly 840 serves as a mounting system for a plurality of tendons 830. The termination assembly 740 may be attached to the balloon envelope 810, for example, by using the heat bonding operations of circular heat press 500 as described above. Once attached, the tendons 830 can be secured to the termination assembly 840, for example, by using a load ring. Thereupon, balloon envelope 810 may be filled for with lift gas flight. For example, in FIG. 8, the balloon envelope 810 is shown filled with lift gas. At this point, payload 820 may be attached and thereafter the balloon 800 may be released into the air.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
 a balloon having a balloon envelope;
 a plurality of tendons attached to the balloon envelope;
 a termination assembly comprising:
  a plate structure with a heat seal, the heat seal being between the plate structure and the balloon envelope, the plate structure having:
   a first portion with a top surface and a bottom surface oriented opposite of the top surface of the first portion, the bottom surface of the first portion being arranged on and attached to the top surface of a second portion; and
   the second portion having a bottom surface oriented opposite of the top surface of the second portion, the bottom surface of the second portion being oriented towards an interior of the balloon envelope; and
  a load ring arranged on and attached to the top surface of the first portion and each tendon of the plurality of tendons, the load ring being configured to support a load of lift gas disposed within the balloon envelope; and
 a circular heat sealer configured to activate the heat seal by pressing and heating the plate structure and the balloon envelope together to create a circular heat seal, wherein the plate structure is configured to form the heat seal as an airtight seal, and
 herein the load ring is positioned internal to the plate structure with respect to the heat seal.

2. The system of claim 1, wherein a portion of the balloon envelope is at an apex of the balloon.

3. The system of claim 1, wherein a portion of the balloon envelope is at a bottom of the balloon.

4. The system of claim 1, wherein the load ring is configured to extend along a circumference of the plate structure.

5. The system of claim 1, wherein the heat seal corresponds to a portion of the plate structure and the portion of the balloon envelope that are melted together.

6. The system of claim 1, wherein the termination assembly further comprises a fill port in communication with an opening disposed on the plate structure, the opening being configured for lift gas to pass into the balloon envelope through the fill port.

7. The system of claim 1, wherein the plate structure is connected to the load ring using a plurality of screws.

8. The system of claim 1, further comprising a frame having an arm connecting a first circular member and a second circular member, the circular heat sealer is arranged in the first circular member, and the second circular member is used in conjunction with the second circular member to press the plate structure and the balloon envelope together.

9. The system of claim 1, wherein both the plate structure and the balloon envelope are formed from a same plastic material.

10. The system of claim 1, wherein the first portion is attached to the second portion via a sealant.

11. The system of claim 1, wherein the heat seal is arranged on the top surface of the second portion.

12. A termination assembly for use with a balloon envelope comprising:
 a plate structure configured for a heat seal to the balloon envelope, the plate structure having:
  a first portion having a top surface and a bottom surface oriented opposite of the top surface of the plate structure, the bottom surface of the first portion being arranged on and attached to a top surface of a second portion;
  the second portion having a bottom surface oriented opposite of the top surface of the second portion, the bottom surface of the second portion being configured for orientation towards an interior of the balloon envelope;
 a plurality of tendons; and
 attached to the top surface of the first portion and each tendon of the plurality of tendons, a load ring being configured to support a load of lift gas disposed within the balloon envelope, wherein the plate structure is configured to form the heat seal as an airtight seal, and
 a circular heat sealer configured to activate the heat seal by pressing and heating the plate structure and the balloon envelope together to create a circular heat seal,
 wherein the load ring is positioned internal to the plate structure with respect to the heat seal.

13. The assembly of claim 12, wherein the plate structure is attached to an apex portion of the balloon envelope.

14. The assembly of claim 12, wherein the load ring is configured to extend along a circumference of the plate structure.

15. The assembly of claim 12, wherein the heat seal corresponds to a portion of the plate structure and the portion of the balloon envelope that are melted together.

16. The assembly of claim 12, further comprising a fill port in communication with an opening disposed on the plate structure, the opening being configured for lift gas to pass into the balloon envelope through the fill port.

* * * * *